US007194762B2

(12) United States Patent
Challener et al.

(10) Patent No.: US 7,194,762 B2
(45) Date of Patent: Mar. 20, 2007

(54) METHOD OF CREATING PASSWORD LIST FOR REMOTE AUTHENTICATION TO SERVICES

(75) Inventors: David Carroll Challener, Raleigh, NC (US); Steven Dale Goodman, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 889 days.

(21) Appl. No.: 09/998,484

(22) Filed: Nov. 30, 2001

(65) Prior Publication Data

US 2003/0105980 A1    Jun. 5, 2003

(51) Int. Cl.
*H04L 9/14* (2006.01)

(52) U.S. Cl. .................. 726/7; 380/284; 713/171; 713/177

(58) Field of Classification Search ............ 713/155, 713/183, 202, 168, 171, 177; 705/51; 726/8, 726/9, 7; 380/284
See application file for complete search history.

(56) References Cited

U.S. PATENT DOCUMENTS

| 4,879,747 | A | | 11/1989 | Leighton et al. ............ 713/186 |
|---|---|---|---|---|
| 4,995,081 | A | | 2/1991 | Leighton et al. ............ 713/186 |
| 5,440,635 | A | | 8/1995 | Bellovin et al. ............ 713/171 |
| 5,481,612 | A | | 1/1996 | Campana et al. ............ 713/159 |
| 5,694,471 | A | | 12/1997 | Chen et al. .................... 705/76 |
| 5,719,941 | A | * | 2/1998 | Swift et al. ................. 713/155 |
| 5,774,650 | A | * | 6/1998 | Chapman et al. ............ 713/200 |
| 5,825,300 | A | * | 10/1998 | Bathrick et al. ............ 340/5.74 |
| 5,884,312 | A | * | 3/1999 | Dustan et al. ................. 707/10 |
| 6,044,155 | A | | 3/2000 | Thomlinson et al. ....... 713/155 |
| 6,061,799 | A | * | 5/2000 | Eldridge et al. .............. 726/20 |
| 6,064,736 | A | * | 5/2000 | Davis et al. ................. 713/155 |
| 6,081,893 | A | | 6/2000 | Grawrock et al. ........... 713/183 |
| 6,094,721 | A | | 7/2000 | Eldridge et al. ............ 713/168 |
| 6,704,868 | B1 | * | 3/2004 | Challener et al. ........... 713/168 |
| 6,725,382 | B1 | * | 4/2004 | Thompson et al. ......... 713/202 |
| 6,898,577 | B1 | * | 5/2005 | Johnson ....................... 705/51 |
| 2002/0083332 | A1 | * | 6/2002 | Grawrock .................... 713/200 |
| 2003/0061494 | A1 | * | 3/2003 | Girard et al. ............... 713/189 |
| 2003/0074566 | A1 | * | 4/2003 | Hypponen .................. 713/183 |

OTHER PUBLICATIONS

TCPA PC Specific Implementation Specification. Sep. 9, 2001. Version 1.00. p. 1-70.*

* cited by examiner

*Primary Examiner*—Ayaz Sheikh
*Assistant Examiner*—Christian LaForgia
(74) *Attorney, Agent, or Firm*—Sawyer Law Group LLP (57) ABSTRACT

A method for providing security in password-based access to computer networks, the network including a server and a remote user, includes: signing a phrase by a security chip of the server using an encryption key; associating the signed phrase with the remote user; signing the phrase with an encryption key obtained by the security chip when a request for access to the computer network is received from the remote user; comparing the phrase signed with the obtained encryption key with the signed phrase associated with the remote user; and granting access to the remote user if the phrase signed with the obtained encryption key is the same as the stored signed phrase associated with the remote user. The use of the encryption key protects against "dictionary attacks". Use of the security chip protects against offline attacks. These provide greater security for the computer network.

24 Claims, 6 Drawing Sheets

METHOD OF CREATING PASSWORD LIST FOR REMOTE AUTHENTICATION TO SERVICES

FIELD OF THE INVENTION

The present invention relates to security in computer networks, and more particularly to protecting remote user access in the computer networks.

BACKGROUND OF THE INVENTION

Figure 1:
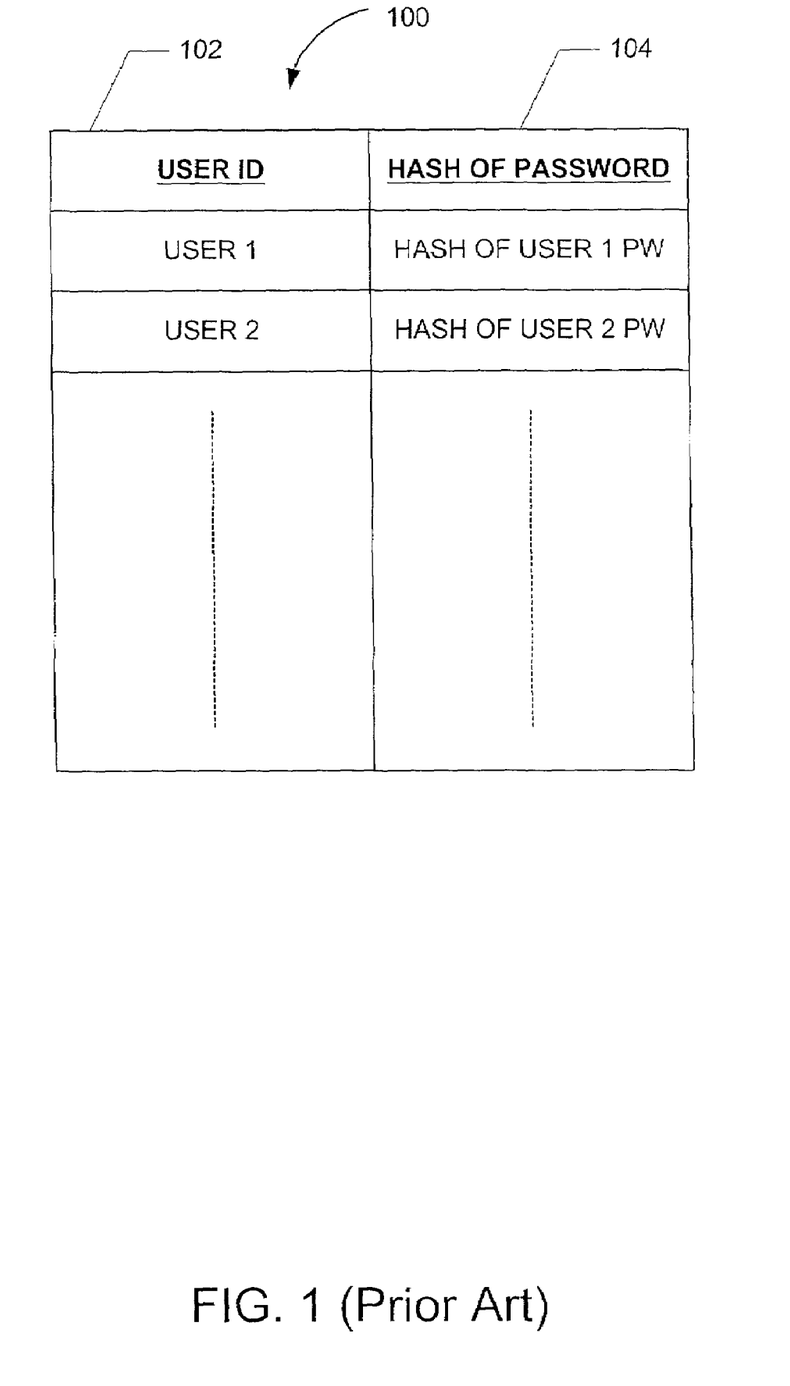
FIG. 1 illustrates a conventional user ID and password table.

Currently, to remotely access a computer network, a user must have a User ID and a password. Typically, a server in the computer network stores the user ID and password in a table. FIG. 1 illustrates a conventional user ID and password table. The table 100 comprises a User ID list 102 and a Hash of Password list 104. The Hash of Password list 104 contains a hash of the passwords corresponding to each user ID. When the user logs into the server, the user provides his/her User ID and password. The server hashes the password provided by the user, and looks up the user's ID in the User ID list 102 in the table 100. The server then compares the stored hashed password corresponding to the user's ID in the Hash of Password list 104 with the hash of the password provided by the user. If they match, then access is granted to the user. If not, then access is denied. By storing the hashes of passwords, the list of passwords cannot be discovered by examining the table.

However, passwords are prone to brute force attacks, such as "dictionary attacks" where an attacker systematically tries known words as passwords. This is a particular security risk especially since most users do not select strong passwords. Also, an attacker can attack "offline", i.e., with another computer. For example, a table of hashes of the most popular passwords can be prepared on another computer. This table may then be used with the server in an attempt to find a match with a user ID in the table 100.

Accordingly, there exists a need for a method and system for improved security in password-based access to computer networks. The method and system should increase the security of the computer network. The present invention addresses this need.

SUMMARY OF THE INVENTION

A method for providing security in password-based access to computer networks, the network including a server and a remote user, includes: signing a phrase by a security chip of the server using an encryption key; associating the signed phrase with the remote user; signing the phrase with an encryption key obtained by the security chip when a request for access to the computer network is received from the remote user; comparing the phrase signed with the obtained encryption key with the signed phrase associated with the remote user; and granting access to the remote user if the phrase signed with the obtained encryption key is the same as the stored signed phrase associated with the remote user. The use of the encryption key protects against "dictionary attacks". Use of the security chip protects against offline attacks. These provide greater security for the computer network.

DETAILED DESCRIPTION

The present invention provides a method and system for improved security in password-based access to computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention comprises a security chip, such as a Trusted Platform Module (TPM). A phrase is signed by the security chip using an encryption key assigned either to the remote user or the security chip. This signed phrase is associated with the remote user and stored. To gain access to the computer network, the encryption key is loaded and used to demonstrate an ability to either recreate the signed phrase or to decrypt the signed phrase by the security chip. If the demonstration is successful, then access is granted. Otherwise, access is denied. The use of the encryption key protects against "dictionary attacks". Use of the security chip protects against offline attacks. These provide greater security for the computer network.

To more particularly describe the features of the present invention, please refer to FIGS. 2 through 7 in conjunction with the discussion below.

Figure 2:
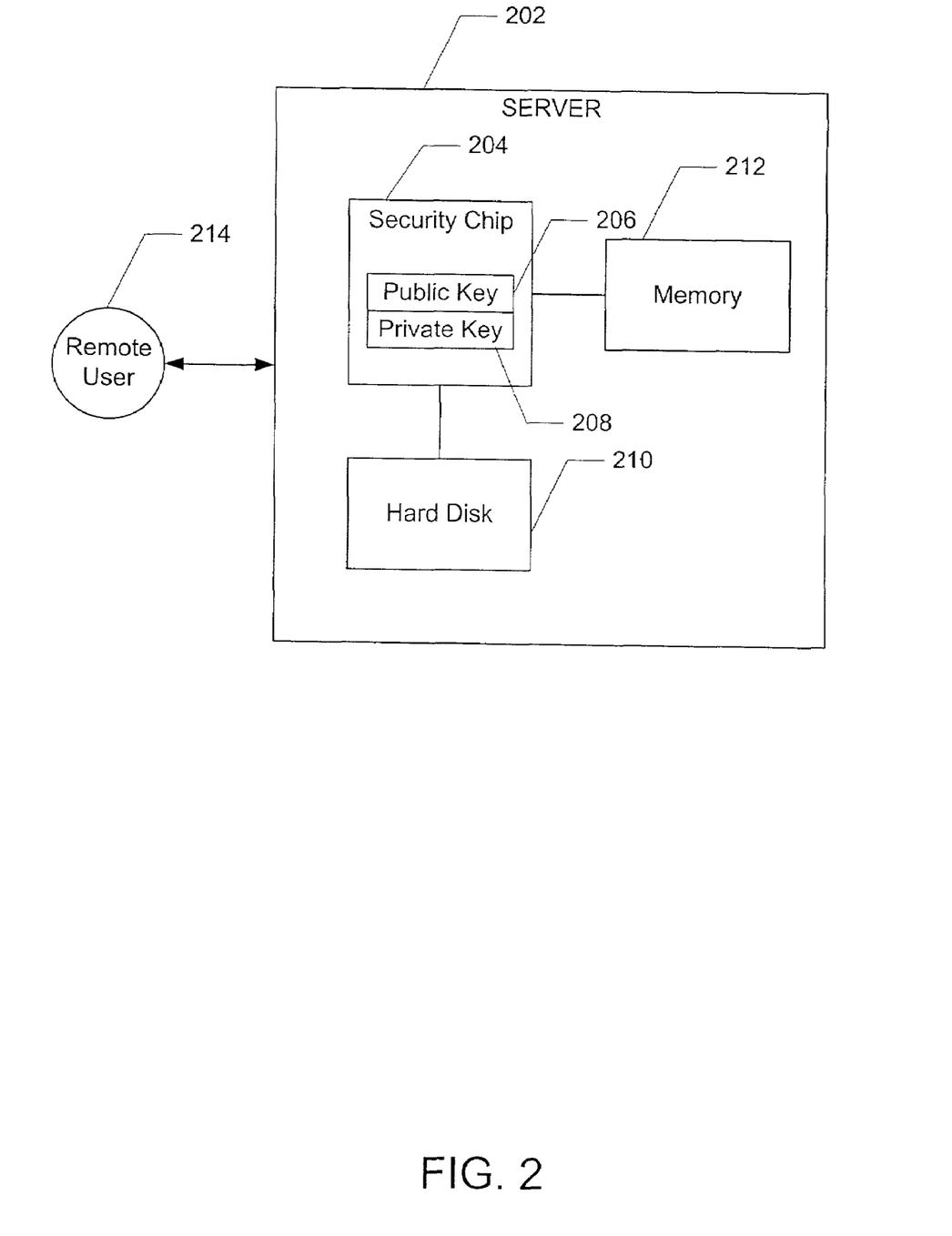
FIG. 2 illustrates a preferred embodiment of a system with improved security in password-based access to computer networks.

FIG. 2 illustrates a preferred embodiment of a system with improved security in password-based access to computer networks. The system comprises a server 202. The server 202 comprises a security chip 204. An example security chip is a Trusted Platform Module (TPM), which follows the Trusted Computing Platform Alliance (TCPA) protocols. The security chip 204 comprises encryption keys, such as a public key 206/private key 208 pair assigned to the chip 204. The server 202 also comprises storage media, such as a hard disk 210 and/or memory 212. The server 202 contains software, which implements the method in accordance with the present invention using the security chip 204. A remote user 214 request access to the computer network by providing his user ID and password to the server 202. The server 202 and security chip 204 grants access to the user 214 if the remote user 214 is authenticated.

Figure 3:
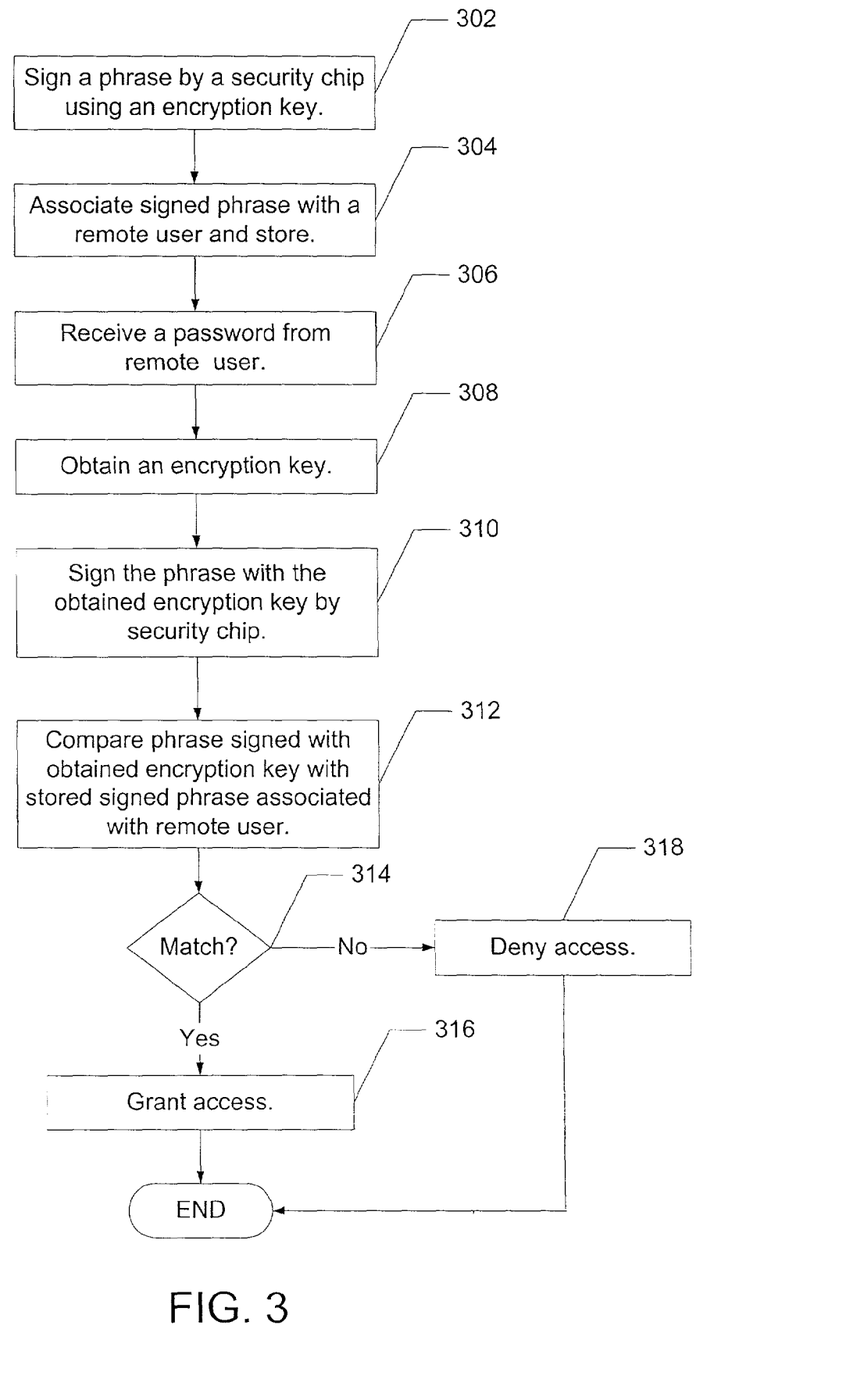
FIG. 3 is a flowchart illustrating a method for improved security in password-based access to computer networks.

FIG. 3 is a flowchart illustrating a method for improved security in password-based access to computer networks. First, the security chip 204 signs a phrase using an encryption key, via step 302. Next, the signed phrase is associated with a remote user 214 and stored, via step 304. The signed phrase may be stored in a table similar to the table 100 illustrated in FIG. 1, except the Hash of Passwords list 104 is replaced by a list of signed phrases associated with each remote user. The server 202 then receives a request for access from the remote user 214, via step 306. In the method in accordance with the present invention, the remote user 214 provides his user ID and password. The security chip 204 then obtains the encryption key, via step 308. For example, the encryption key can be the private key 208 of the security chip 204 or a private key (not shown) for the remote user 214. The private key for the remote user 214 can be stored encrypted on one of the storage media 210 or 212. The security chip 204 then signs the phrase with the obtained encryption key, via step 310. The phrase can be a known phrase or a secret phrase. The phrase signed with the obtained encryption key is then compared with the stored signed phrase associated with the remote user 214, via step 312. If the stored signed phrase is the same as the phrase signed with the obtained encryption key, via step 314, then access is granted to the remote user 214, via step 316. If not, then access is denied, via step 318.

The encryption key provides greater entropy. Thus, it is significantly less prone to brute force attacks than passwords. Many security chips 204, such as the TPM, allow a certain number of unsuccessful password entries before locking out a remote user. Thus, using a security chip further decreases the exposure to brute force attacks. Also, because the cooperation of the security chip 204 is required to gain access, offline attacks are not possible.

Figure 4:
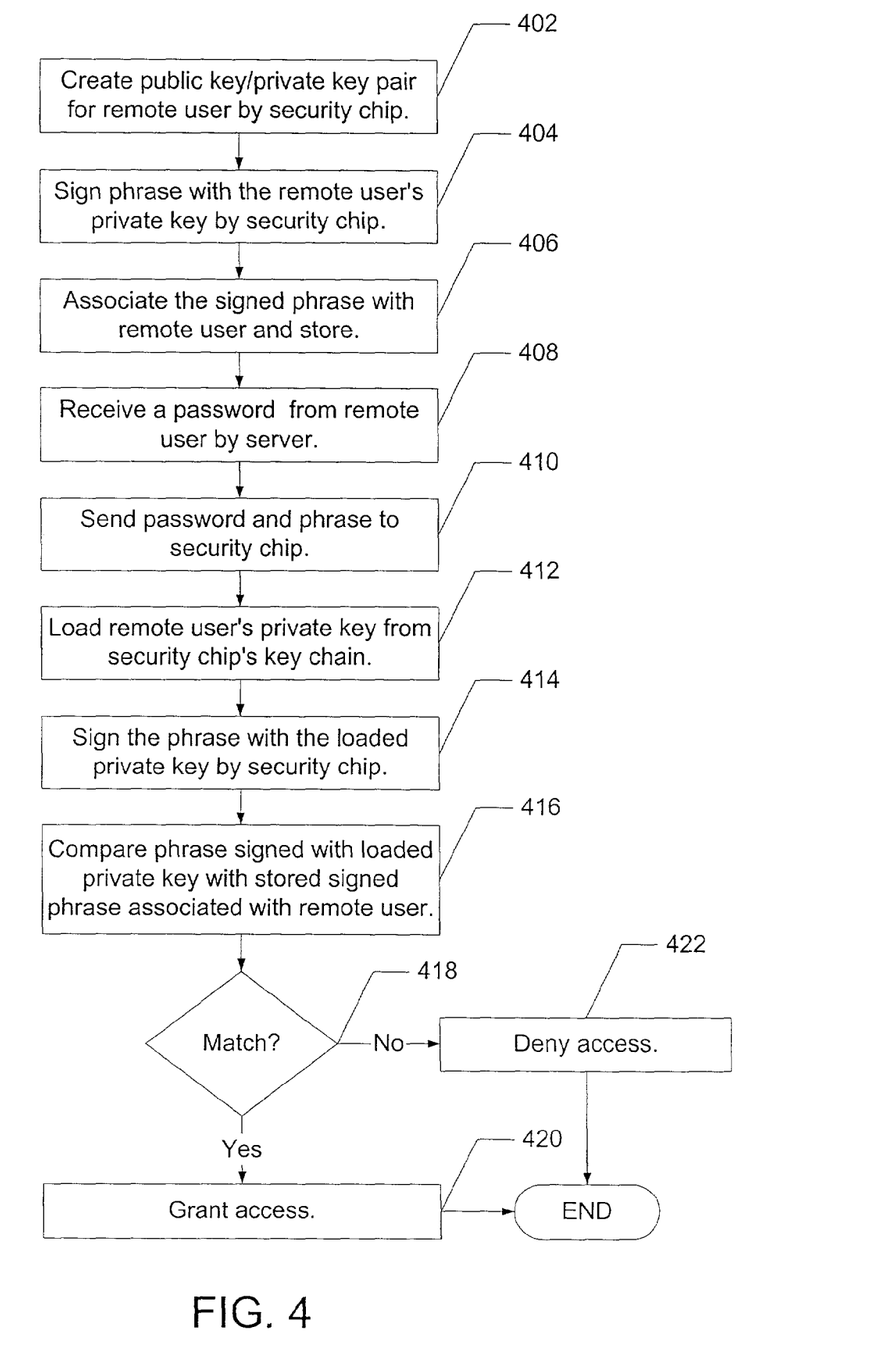
FIG. 4 is a flowchart illustrating a first preferred embodiment of the method for improved security in password-based access to computer networks.
Figure 5:
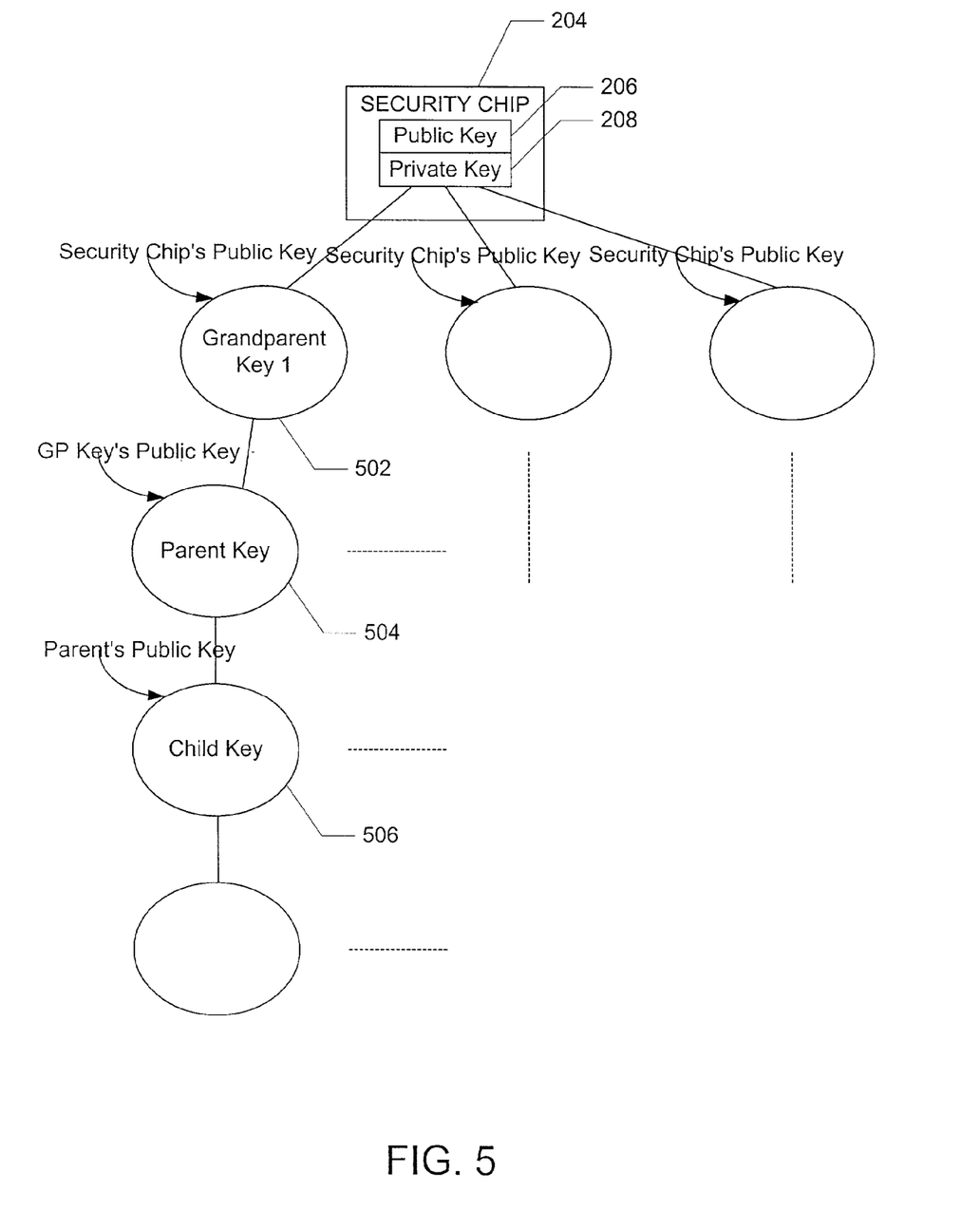
FIG. 5 illustrates a security chip key chain.

FIG. 4 is a flowchart illustrating a first preferred embodiment of the method for improved security in password-based access to computer networks. First, a public key/private key pair is created for the remote user 214 by the security chip 204, via step 402. Public key/private key pair cryptography is well known in the art. The remote user's 214 public/private key pair is stored in the security chip's 204 key chain. FIG. 5 illustrates a security chip key chain. The security chip 204 generates a set of grandfather public/private key pairs 502 for the computer network. Each of these grandparent key pairs 502 is wrapped using the security chip's 204 public key 206. The security chip 204 can then generate parent key pairs 504 and wrap them in the grandparent key's 502 public key. Child key pairs 506 may be generated and wrapped in the parent key's 504 public key. The private key created for the remote user 214 by the security chip 204 is stored in such a key chain.

Returning to FIG. 4, once the public/private key pair is created for the remote user 214, via step 402, the security chip 204 signs a phrase with the remote user's 214 private key, via step 404. This signed phrase is associated with the remote user 214 and stored on the server 202, via step 406. In the first preferred embodiment, the remote user's 214 user ID and signed phrase are stored in a user ID/signed phrase table similar to table 100 illustrated in FIG. 1, except a list of signed phrases associated with each user ID is stored in place of the Hash of Password list 104. In the first preferred embodiment, the phrase is a known phrase and can be any text or string. To request access, the remote user 214 sends his user ID and password to the server 202. The server 202 receives the password from the remote user 214, via step 408. The received password and the phrase are sent to the security chip 204, via step 410. The security chip 204 is asked to sign the phrase. The security chip 204 then loads the remote user's 214 private key from its key chain, via step 412. The security chip 204 uses the loaded private key to sign the phrase, via step 414. The phrase signed with the loaded private key is then compared with the stored signed phrase associated with the remote user 214, via step 416. If they match, via step 418, then access is granted to the remote user 214, via step 420. If not, then access is denied, via step 422.

Because the passwords themselves are not stored in the user ID/signed phrase table, they cannot be discovered by an attacker by hacking the table. Because a signature with a remote user's private key is used to determine access, they are protected against "dictionary attacks". Private keys comprises enough number of bits that such a "brute force" approach is not practical. Thus, a significant amount of additional entropy is provided. Also, since the cooperation of the security chip 204 is required, offline attacks with other computers are not possible. The hacker must attack the server 202, which has the security chip 204. In addition, security chips 204 such as the TPM allow only a certain number of unsuccessful entries of a password before a user is locked out. So the use of the security chip 204 enforces protection against hardware hammering.

Figure 6:
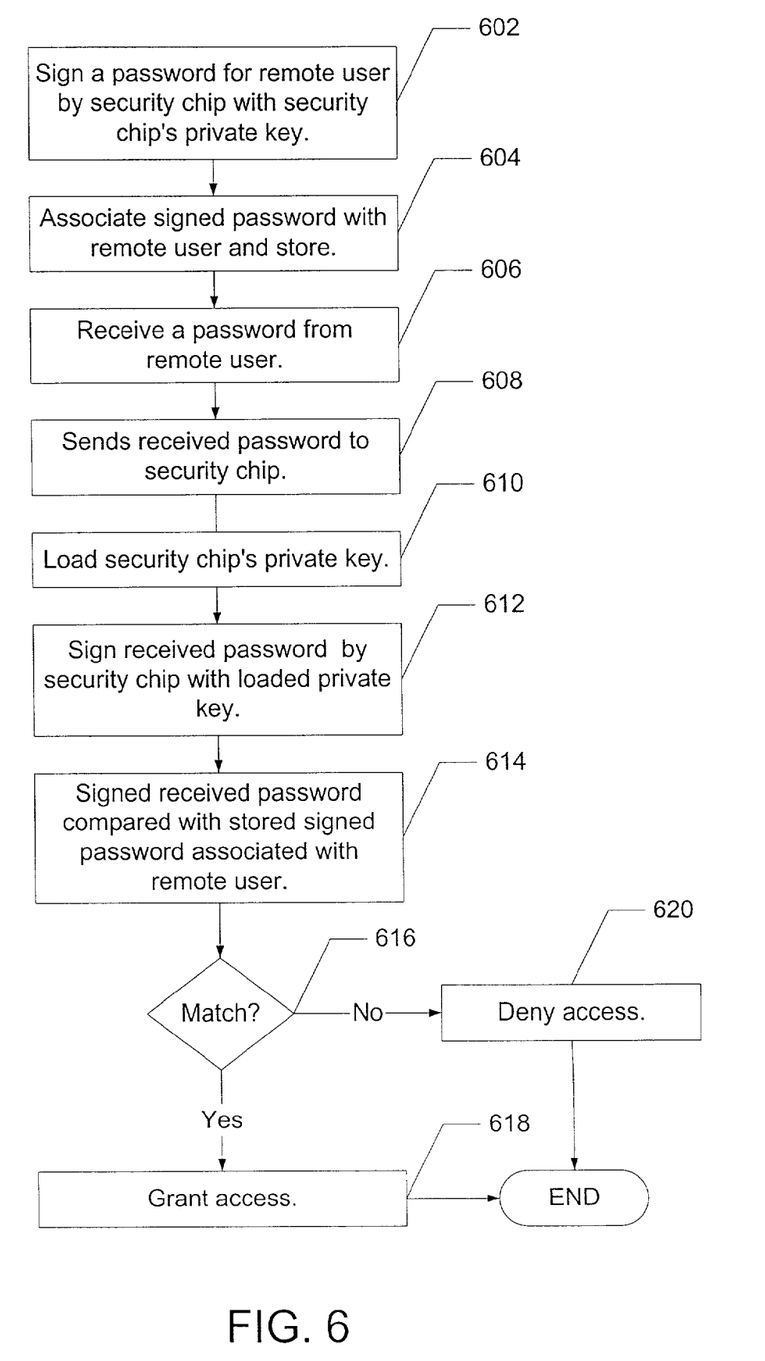
FIG. 6 is a flowchart illustrating a second preferred embodiment of the method for improved security in password-based access to computer networks.

FIG. 6 is a flowchart illustrating a second preferred embodiment of the method for improved security in password-based access to computer networks. First, a password for the remote user 214 is signed by the security chip 204 with the security chip's 204 private key 208, via step 602. The signed password is associated with the remote user 214 and stored on the server 202, via step 604, in a user ID/signed password table similar to table 100 illustrated in FIG. 1, except a list of signed passwords associated with each user ID is stored in place of the Hash of Password list 104. When the server 202 receives a password from the remote user 214, via step 606, the server 202 sends the received password to the security chip 204, via step 608. The security chip 204 then loads its private key 208, via step 610, and signs the received password with it, via step 612. The received password signed with the security chip's 204 private key 208 is then compared with the stored signed password associated with the remote user 214, via step 614. If they match, via step 616, then access is granted to the remote user 214, via step 618. If not, then access is denied, via step 620.

In the second preferred embodiment, additional entropy is provided because the cooperation of the security chip 204 is required. Thus, offline attacks are not possible. However, the public key 206 of the security chip 204 should be destroyed or hidden to avoid inversion of the stored signed passwords by an attacker.

FIG. 7 is a flowchart illustrating a third preferred embodiment of the method for improved security in password-based access to computer networks. First, a blob is created for the remote user 214, via step 602, where the blob comprises the remote user's 214 password signed with the security chip's 204 private key 208. The blob is associated with the remote user 214 and stored on the server 202, via step 604, in a user ID/hashed password/blob table similar to the table 100 illustrating in FIG. 1, except an additional column for the blobs associated with each user ID is added. When the server 202 receives a password from the remote user 214, via step 606, the received password and the blob associated with the remote user's user ID are sent to the security chip 204, via step 608. The security chip 204 then decrypts the blob using its public key 206 to obtain the password stored in the blob, via step 610. The stored password is then compared with the received password, via step 612. If they match, via step 614, then the access is granted to the remote user 214, via step 616. Otherwise, access is denied, via step 618.

Because the cooperation of the security chip 204 is required in the third embodiment, only a certain number of unsuccessful entries of the password are allowed. This provides additional entropy by protecting against hardware hammering.

A method and system for improved security in password-based access to computer networks has been disclosed. The system comprises a security chip, such as a Trusted Platform Module (TPM). A phrase is signed by the security chip using an encryption key assigned either to the remote user or the security chip. This signed phrase is associated with the remote user and stored. To gain access to the computer network, the encryption key is loaded and used to demonstrate an ability to either recreate the signed phrase or to decrypt the signed phrase by the security chip. If the demonstration is successful, then access is granted. Otherwise, access is denied. The use of the encryption key protects against "dictionary attacks". Use of the security chip protects against offline attacks. These provide greater security for the computer network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving security in a computer network utilizing password-based access, the method comprising:
   signing a phrase using a private key assigned to a remote user;
   associating the signed phrased with the remote user; and
   storing the private key assigned to the remote user in a key chain of a provided security chip, wherein the key chain is formed by wrapping the private key using at least one child key pair assigned to the computer network, wrapping the at least one child key pair using at least one parent key pair assigned to the computer network, wrapping the at least one parent key pair using at least one grandparent key pair assigned to the computer network, and wrapping the at least one grandparent key pair using an encryption key assigned to the provided security chip.

2. The method of claim 1, wherein the phrase is a password of the remote user.

3. The method of claim 1, wherein the phase is separate from a password of the remote user.

4. The method of claim 1, further comprising:
   using the signed phrase associated with the remote user to determine whether to grant the remote user access to the computer network.

5. The method of claim 1, wherein the private key assigned to the remote user, the encryption key assigned to the provided security chip, and the at least one child key pair, the at least one parent key pair, and the at least one grandparent key pair assigned to the computer network are created within the provided security chip.

6. The method of claim 1, wherein both the private key assigned to the remote user and the encryption key assigned to the provided security chip are known only to the provided security chip.

7. The method of claim 1, wherein the provided security chip is a Trusted Platform Module (TPM).

8. The method of claim 1, further comprising:
   storing the signed phrase associated with the remote user.

9. A computer readable medium including a computer program for improving security in a computer network utilizing password-based access, the computer program comprising instructions for:
   signing a phrase using a private key assigned to a remote user;
   associating the signed phrased with the remote user; and
   storing the private key assigned to the remote user in a key chain of a provided security chip, wherein the key chain is formed by wrapping the private key using at least one child key pair assigned to the computer network, wrapping the at least one child key pair using at least one parent key pair assigned to the computer network, wrapping the at least one parent key pair using at least one grandparent key pair assigned to the computer network, and wrapping the at least one grandparent key pair using an encryption key assigned to the provided security chip.

10. The computer readable medium of claim 9, wherein the phrase is a password of the remote user.

11. The computer readable medium of claim 9, wherein the phrase is separate from a password of the remote user.

12. The computer readable medium of claim 9, wherein the computer program further comprises instructions for:
   using the signed phrase associated with the remote user to determine whether to grant the remote user access to the computer network.

13. The computer readable medium of claim 9, wherein the private key assigned to the remote user, the encryption key assigned to the provided security chip, and the at least one child key pair, the at least one parent key pair, and the at least one grandparent key pair assigned to the computer network are created within the provided security chip.

14. The computer readable medium of claim 9, wherein both the private key assigned to the remote user and the encryption key assigned to the provided security chip are known only to the provided security chip.

15. The computer readable medium of claim 9, wherein the provided security chip is a Trusted Platform Module (TPM).

16. The computer readable medium of claim 9, wherein the computer program further comprises instructions for:
   storing the signed phrase associated with the remote user.

17. A system for improving security in a computer network utilizing password-based access, the system being operable to:
   sign a phrase using a private key assigned to a remote user;
   associate the signed phrased with the remote user; and
   store the private key assigned to the remote user in a key chain of a provided security chip, wherein the key chain is formed by wrapping the private key using at least one child key pair assigned to the computer network, wrapping the at least one child key pair using at least one parent key pair assigned to the computer network, wrapping the at least one parent key pair using at least one grandparent key pair assigned to the computer network, and wrapping the at least one grandparent key pair using an encryption key assigned to the provided security chip.

18. The system of claim 17, wherein the phrase is a password of the remote user.

19. The system of claim 17, wherein the phrase is separate from a password of the remote user.

20. The system of claim 17, wherein the system is further operable to:
  use the signed phrase associated with the remote user to determine whether to grant the remote user access to the computer network.

21. The system of claim 17, wherein the private key assigned to the remote user, the encryption key assigned to the provided security chip, and the at least one child key pair, the at least one parent key pair, and the at least one grandparent key pair assigned to the computer network are created within the provided security chip.

22. The system of claim 17, wherein both the private key assigned to the remote user and the encryption key assigned to the provided security chip are known only to the provided security chip.

23. The system of claim 17, wherein the provided security chip is a Trusted Platform Module (TPM).

24. The system of claim 17, wherein the system is further operable to:
  store the signed phrase associated with the remote user.

* * * * *